(12) United States Patent
Naguib

(10) Patent No.: US 9,102,870 B1
(45) Date of Patent: Aug. 11, 2015

(54) ADDITIVES FOR SOIL, SOIL COMPOSITIONS AND METHODS OF MAKING

(75) Inventor: Aiman Naguib, Plano, TX (US)

(73) Assignee: ENTACT, LLC, Grapevine, TX (US)

( * ) Notice: Subject to any disclaimer, the term of this patent is extended or adjusted under 35 U.S.C. 154(b) by 693 days.

(21) Appl. No.: 13/311,024

(22) Filed: Dec. 5, 2011

(51) Int. Cl.
| C09K 17/40 | (2006.01) |
| C09K 17/04 | (2006.01) |
| C09K 17/06 | (2006.01) |

(52) U.S. Cl.
CPC ............. *C09K 17/40* (2013.01); *C09K 17/04* (2013.01); *C09K 17/06* (2013.01); *Y10S 47/10* (2013.01)

(58) Field of Classification Search
None
See application file for complete search history.

(56) References Cited

U.S. PATENT DOCUMENTS

| 3,230,103 A | * | 1/1966 | Minnick ................ 106/707 |
| 3,854,968 A | * | 12/1974 | Minnick et al. ........... 106/710 |
| 4,022,633 A | | 5/1977 | Schneider |
| 4,134,862 A | | 1/1979 | Eden et al. |
| 4,209,335 A | * | 6/1980 | Katayama et al. .......... 588/252 |
| 4,328,037 A | | 5/1982 | Demirel et al. |
| 4,343,751 A | | 8/1982 | Kumar |
| 4,914,066 A | | 4/1990 | Woodrum |
| 5,018,906 A | | 5/1991 | Bonier-Sahuc |
| 5,082,500 A | | 1/1992 | Nachtman et al. |
| 5,318,730 A | | 6/1994 | Rieser et al. |
| 5,484,479 A | | 1/1996 | Weber |
| 5,516,830 A | | 5/1996 | Nachtman et al. |
| 5,560,992 A | | 10/1996 | Sargent et al. |
| 5,584,792 A | * | 12/1996 | Webster .................... 588/257 |
| 5,733,576 A | | 3/1998 | Chmelir |
| 5,814,147 A | | 9/1998 | Tallard |
| 5,860,770 A | | 1/1999 | Hunt |
| 5,900,038 A | | 5/1999 | Wilhelm et al. |
| 5,980,446 A | | 11/1999 | Loomis et al. |
| 6,076,997 A | | 6/2000 | First et al. |
| 6,669,773 B2 | | 12/2003 | Malloy et al. |
| 7,241,818 B2 | | 7/2007 | Hemmings et al. |
| 7,284,930 B2 | | 10/2007 | Shi et al. |
| 7,396,866 B2 | | 7/2008 | Jariwala et al. |
| 7,439,308 B2 | | 10/2008 | Ohno et al. |
| 7,503,143 B2 | | 3/2009 | Krysiak et al. |
| 7,582,158 B2 | | 9/2009 | Setliff et al. |

(Continued)

FOREIGN PATENT DOCUMENTS

| AU | 2005202108 A1 | 12/2005 |
| CA | 2502002 A1 | 4/2004 |

(Continued)

*Primary Examiner* — Melvin C Mayes
*Assistant Examiner* — Colette Nguyen
(74) *Attorney, Agent, or Firm* — Gardere Wynne Sewell LLP

(57) ABSTRACT

Improvements for soil are described that include a first particle in dry or powder form with a calcium oxide content greater than a second particle, the second particle, also in dry or powder form, with a calcium oxide content less than the first particle and preferably a low sulfate content. When added to soil the improvement maintains a low sulfate content, generally 5,000 ppm or less. Methods of improving soil are also described. When added to soil, the improvement described increases the original soil strength, sufficient for foundation and piling structures, road works and/or buildings or equipment. When soil is modified as described, the improved soil will have an unconfined compressive strength of less than 100 psi or less than 75 psi in 28 days. The improved soil is stronger, suitable for large scale projects while satisfying or maintaining a low sulfate content and a desired UCS value.

14 Claims, 1 Drawing Sheet

(56) References Cited

U.S. PATENT DOCUMENTS

| | | |
|---|---|---|
| 7,730,662 B2 | 6/2010 | Krysiak et al. |
| 7,874,101 B2 | 1/2011 | Krysiak et al. |
| 7,897,831 B2 | 3/2011 | Birdwell |
| 2004/0025752 A1* | 2/2004 | Sugama .................. 106/692 |
| 2006/0054059 A1 | 3/2006 | Dubey et al. |
| 2006/0135673 A1 | 6/2006 | Temperante et al. |
| 2009/0036728 A1 | 2/2009 | Birdwell |
| 2009/0142542 A1 | 6/2009 | Halahmi et al. |
| 2010/0071309 A1 | 3/2010 | Brangan et al. |
| 2010/0084491 A1 | 4/2010 | Williams et al. |
| 2011/0099899 A1 | 5/2011 | Krysiak et al. |
| 2011/0203338 A1 | 8/2011 | Birdwell |
| 2011/0217528 A1 | 9/2011 | Wiercinski et al. |
| 2012/0145044 A1* | 6/2012 | Mills et al. .................. 106/695 |

FOREIGN PATENT DOCUMENTS

| | | | |
|---|---|---|---|
| JP | 07292357 A | | 11/1995 |
| JP | 08239660 A | | 9/1996 |
| JP | 2005054022 | * | 3/2005 |
| JP | 2005054022 A | | 3/2005 |
| JP | 2005105266 A | | 4/2005 |
| JP | 2006502734 A | | 1/2006 |
| JP | 2008121263 A | | 5/2008 |
| JP | 2010059640 A | | 3/2010 |
| JP | 2010059640 | * | 8/2010 |
| WO | WO-2004035633 A2 | | 4/2004 |
| WO | WO-2006051875 A1 | | 5/2006 |

\* cited by examiner

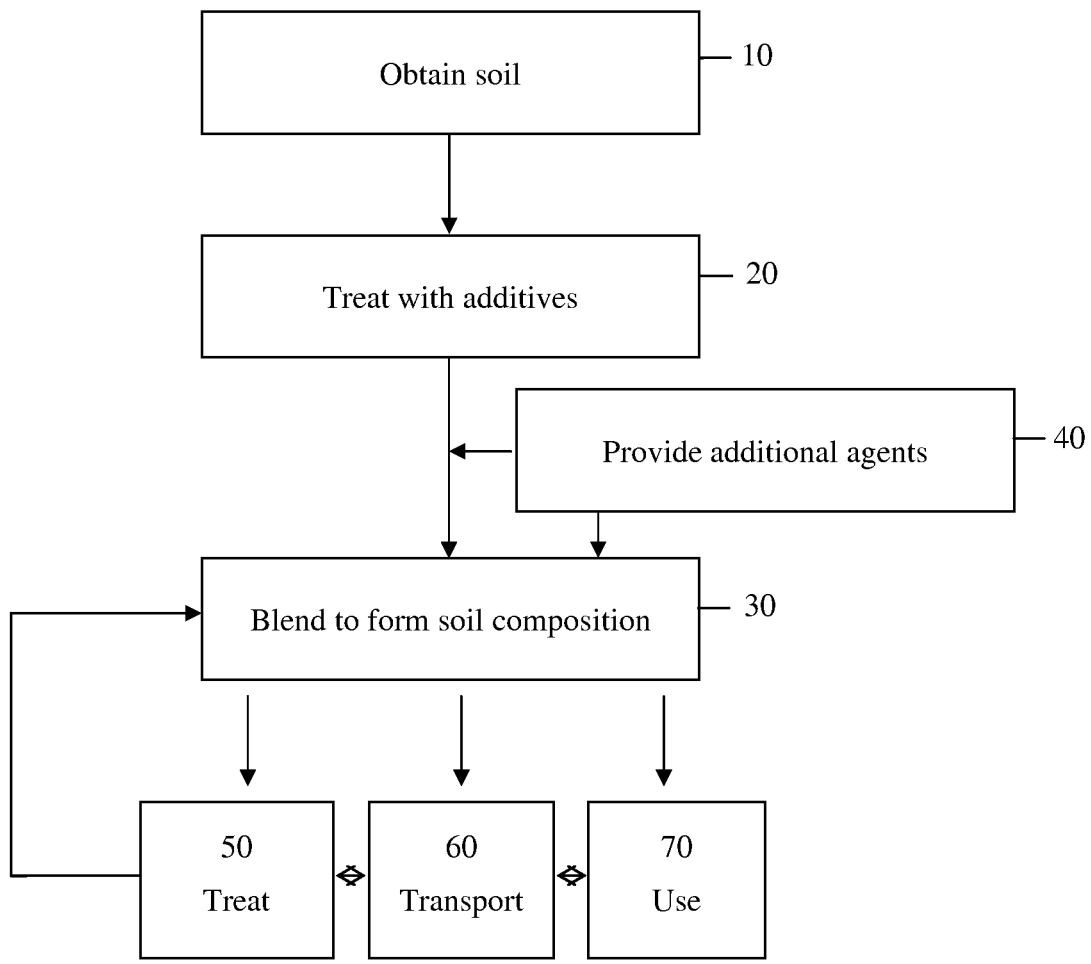

ADDITIVES FOR SOIL, SOIL COMPOSITIONS AND METHODS OF MAKING

CROSS REFERENCE TO RELATED APPLICATIONS

None.

BACKGROUND

Soil additives are known. There is, however, an absence of successful and cost effective soil additives that meet a desired unconfined compressive strength (UCS) value as described herein and that provide a desirable or low sulfate content.

There remains a need for improvements for soil or compositions that when added to soil will maintain a low sulfate content of the soil, such as a sulfate content of 5,000 ppm or less. There also remains a need for improvements for soil or compositions that when added to soil will increase soil strength properties and provide sufficient bearing capacity to support above ground structures and installation thereof as well as provide support for equipment used in the installation of foundation structures, road works and/or piling structures, as representative examples.

In addition, there remains a need for improvements in and for compositions that when added to soil, satisfy or maintain a desired UCS value for the soil, including UCS values obtained and desired for large scale projects, including fast-track projects. There remains a need for improvements in and for compositions that when added to soil are successful and satisfy desired UCS values for large scale projects, including fast-track projects. Furthermore, there remains a need for improvements in and for compositions that when added to soil are cost effective while satisfying or maintaining a desired or low sulfate content and/or a desired or low UCS value.

OVERVIEW

Described herein are improvements for soil that when added meet needs described above.

In one or more embodiments are described an addition for soil, the addition comprising a first particle, wherein the first particle is in dry or powder form and has a calcium oxide content greater than a second particle, the second particle having a calcium oxide content that is less than the first particle and a low sulfate content, wherein the second particle is in dry or powder form, and a polymer, wherein the polymer is an acrylic polymer or copolymer added in an amount that is less than 1% based on weight of the soil. The first particle may be a circulating fluidized boiler ash. The first particle may be a combustion by-product from a lime or limestone injection boiler. The first particle has a calcium oxide content greater than 20 wt. %. The second particle may be a fly ash, such as a Class C fly ash. The second particle may have a calcium oxide content less than 20 wt. % and is further supplemented with a lime source to achieve a calcium oxide content greater 20 wt. %. The addition when combined with soil provides an unconfined compressive strength to the soil that is less than 100 psi in 28 days. The addition when combined with soil may provide an unconfined compressive strength to the soil that may be between about 25 and 75 psi in 28 days. The polymer may include an anionic surfactant in a hydrotreated distillate. The addition is, in one form, for soil considered to be uncontaminated by harmful petrochemicals or hydrocarbon compounds or soil that is not considered to be sludge from a commercial or industrial operation. In addition or as an alternative, the addition described herein may be used for impacted soil, for soil combined with sludge, or for sludge.

In additional embodiments are described a soil composition comprising soil that has been strengthened to an unconfined compressive strength of less than 100 psi in 28 days, wherein the soil is strengthened by an addition comprising: a first particle, wherein the first particle is in dry or powder form and has a calcium oxide content greater than a second particle; the second particle having a calcium oxide content that is less than the first particle and a low sulfate content, wherein the second particle is in dry or powder form; and a polymer, wherein the polymer is an acrylic polymer or copolymer added in an amount that is less than 1% based on weight of the soil. The first particle may be a circulating fluidized boiler ash. The first particle may be a combustion by-product from a lime or limestone injection boiler. The second particle may be fly ash with a calcium oxide content greater than 20%. The polymer may include an anionic surfactant in a hydrotreated distillate. The soil may be considered to be uncontaminated by harmful petrochemicals or hydrocarbon compounds or is not sludge from a commercial or industrial operation.

Still further is described a method of preparing a soil composition comprising providing an addition to soil in order to strengthen the soil blending the addition into the soil to achieve an unconfined compressive strength of less than 100 psi in 28 days, wherein the addition comprises: a first particle, wherein the first particle is in dry or powder form and has a calcium oxide content greater than a second particle; the second particle having a calcium oxide content that is less than the first particle and a low sulfate content, wherein the second particle is in dry or powder form; and a polymer, wherein the polymer is an acrylic polymer or copolymer added in an amount that is less than 1% based on weight of the soil. The addition may be in a range of from about 5 weight percent to about 25 weight percent, based on the weight of the soil. The method may be conducted in a single pass. The step of providing may further comprise adding the first particle and the second particle and thereafter adding the polymer.

In additional embodiments, described herein are one or more compositions that comprise soil, circulating fluidized boiler ash, and Class C fly ash, wherein the composition has an unconfined compressive strength of less than 50 psi in 28 days and a sulfate content less than 5000 ppm, and wherein the soil is not considered as sludge from a commercial or industrial operation. In addition or as an alternative, the composition that comprises circulating fluidized boiler ash and Class C fly ash may comprise impacted soils, soil combined with sludge, or sludge.

These and other embodiments and features and the advantages thereof, will become readily apparent from the following description, taken in conjunction with any exemplary representations, drawings and/or example.

BRIEF DESCRIPTION OF THE DRAWINGS

For more complete understanding of the features and advantages described herein, reference is now made to a description along with accompanying figures, wherein FIG. 1 is representative chart depicting a method described herein.

DETAILED DESCRIPTION

Although making and using various embodiments are discussed in detail below, it should be appreciated that as described herein are provided many inventive concepts that may be embodied in a wide variety of contexts. Embodiments discussed herein are merely representative and do not limit the scope of the invention.

Generally, processes and compositions described herein are processes and compositions for the improvement and modification of soil. The soil (prior to modification) may be considered weak. The soil (prior to modification) may also be considered to be clean soil, such as soil not considered to be contaminated with petrochemicals or hydrocarbon compounds or from mining or oil or refineries or cement or chemical/industrial operations (e.g., not sludge or containing sludge). In some embodiments, the soil is located in or obtained from one or more areas that do not generally have traffic or cannot maintain traffic or allow equipment to be trafficked across the soil prior to being modified. The soil, itself, may be light (e.g., sand-like) or medium (e.g., loamy) or heavy (e.g., clay-like). Thus, the soil may comprise clay, sand, silt and combinations thereof. The soil may be saturated, dry or any variation thereof. The moisture content of many land soils is generally about 25% (e.g., loamy soil). In some embodiments, the soil described herein has a moisture content of from about 25 wt % to up to about 85%. In one or more forms, the soil is relatively saturated. In some embodiments, the soil as described herein, the soil is located in or obtained from an area, such as a wetland, swamp, and/or marsh, such as from a coastal area.

In some embodiments, the soil is relatively uncontaminated. Such soil will not be considered as sludge. The soil, however, in one or more embodiments may include contaminant(s) and/or sludge. In addition or as an alternative, the soil may be impacted soil, soil combined with sludge, or sludge.

As described herein, additives are provided to soil in order to improve one or more soil properties. In some embodiments, additives are provided that modify and reduce saturation of the soil. In some embodiments, additives are provided that modify and improve the strength of the soil. In one or more embodiments, additives are provided that modify the soil to achieve an unconfined compressive strength (UCS) of the soil that is less than 100 psi in 28 days. In some embodiments, additives are provided to achieve a UCS of 20 psi to less than 100 psi in 28 days. In some embodiments, additives are provided to achieve a UCS of 25 psi to 75 psi in 28 days. In some embodiments, additives are provided to achieve a UCS of 25 psi to 50 psi in 28 days. In some embodiments, additives are provided to achieve a UCS of at or less than about 50 psi in 28 days. Additionally or as an alternative, additives are provided to soil to achieve a soil composition with a sulfate content of about 5, 000 ppm or less after introduction of the additives to soil.

Additives described herein include a combination of particulates that, in one or more embodiments, provide a soil sulfate content of 5,000 ppm or less after addition to the soil. A low sulfate content allows installation of foundation structures and/or piling structures and/or road or other building structures onto the improved soil composition without a risk of the soil leading to corrosion or deterioration to the foundation structures and/or piling structures and/or road or other building structures.

In one or more forms, two additives are combined. The additives are generally in dry or powder form and remain in dry or powder form when combined. The first additive is a particle with a high calcium oxide content. The calcium oxide content of the first additive will be greater than the calcium oxide content of the second additive. In some embodiments, the calcium oxide content is about or greater than 25% by weight. In additional embodiments, the calcium oxide content is about or greater than 30% by weight. In still additional embodiments, the calcium oxide content is about or greater than 35% by weight. In still additional embodiments, the calcium oxide content is about or greater than 40% by weight. In still additional embodiments, the calcium oxide content is about or greater than 45% by weight. In additional embodiments, the calcium oxide content is about or greater than 50% by weight. In additional embodiments, the calcium oxide content is about or greater than 55% by weight. In additional embodiments, the calcium oxide content is up to or about 60% by weight. In additional embodiments, the calcium oxide content is between about 25% and about 60% by weight. In further embodiments, the calcium oxide content is between about 35% and about 75% by weight. The first additive will often have a high sulfur content or higher sulfur content than the second additive. A suitable example of this additive is ash or other residue from coke combustion, such as from a circulating fluidized boiler (CFB) or other limestone or lime injection boiler. Bed ash or bottom ash made with lime or having a high calcium oxide or calcined lime content is also suitable. CFB ash, for example, has a high calcium oxide content and also has a high sulfur amount. Another example is a bed ash with a calcium oxide content of about 50 wt. % and a sulfur trioxide content of about 46 wt. % (ignited basis). A further example is a bed ash with a calcium oxide content of about 56 wt. % and a sulfur trioxide content of about 42 wt. % (ignited basis). As a result, the silica, alumina and iron oxide content of the first particle will generally be lower sometimes much lower. In some instances, the combined silica, alumina and iron oxide content of the first particle is as low as or less than 3 wt. %. However, amounts greater than 3 wt. % will also arise with some boilers or methods used.

The second additive is generally a particle with a low calcium oxide content or a lower calcium oxide content than the first additive and will have a low sulfur content or lower sulfur content than the first additive. A suitable example of the second additive is Class C fly ash or other particle residue from coal combustion. For example, Class C fly ash contains more than 20% calcium oxide or lime. In some embodiments, the calcium oxide content of the second additive is greater than 20 wt. % and up to about 30 wt. % or 35 wt. %. Class F fly ash may be incorporated, which typically has a calcium oxide or lime content less than 20% and, here, the calcium oxide content may be supplemented with the addition of lime or a lime source. A representative example is a Class C fly ash with a calcium oxide content of about 26 wt. % and a sulfur trioxide content of about 3 wt. % (ignited basis). The combined silica, alumina and iron oxide content of the second particle will generally be higher than that of the first particle. In one example, the combined silica, alumina and iron oxide content of the second particle is greater than 3 wt. % or greater than 10 wt. % or greater than 20 wt. %. In some embodiments, the combined silica, alumina and iron oxide content of the second particle is greater than 50 wt. %.

In one embodiment, to maintain a desired UCS value of the soil after modification, the first additive with a high calcium oxide content is required. The first additive will also have a high sulfur content. To reduce the overall sulfur content of the additives when blended with soil, the first additive is combined with a second additive that has a sulfur content that is lower than that of the first additive.

In some embodiments, a second particle, such as a Class C fly ash, will have a calcium oxide content as great as or greater than the first particle and such particles may be combined with the first particle; however, such second particles will have a sulfur content that is less than the first particle. A representative example is a Class C fly ash with a calcium oxide content of 59 wt. % (ignited basis) or between about 25 wt. % and 60 wt. % with a sulfur trioxide content of about 36 wt. % or less.

The additives are combined together prior to their addition to soil. In some embodiments the additives are each added separately to the soil and then blended. The additives are generally added to the soil in dry or powder form. The additives do not require a cementitious binder nor do they require the addition of a cementitious binder. In addition, in one or more embodiments, the additives do not require pre-curing, pre-hardening or pre-wetting or any further modification before being added or combined with the soil. In one or more embodiments, the additives do not undergo any pre-curing or pre-hardening or any modification before addition to soil. Thus, the additives are generally in dry form and not coated or masked or wetted and do not undergo a chemical or physical alteration before being added to the soil in need of modification. The additives, when combined may be added directly to the soil in need of amendment or the soil and additives may be co-combined in another location. The additives, in dry form, may be combined and stored for an indefinite period of time prior to use, which is prior to blending with the soil.

In one or more forms, additives are combined in dry form and then added to the soil in need of improvement. The additives are often added to the surface of the soil in need of improvement and there after the soil is blended to more fully intermix the additives with the soil in need of improvement to form an improved soil composition. For amendment of soil in order to prepare a road surface, the soil may be amended to a depth of about one foot to a few feet or more. For amendment of soil for high traffic support or for support of building or heavy equipment, the soil may be amended to a depth of about one foot to up to or more than 20 feet. Any suitable tool or equipment for mixing the additives into the soil to the desired depth may be used. Mixing of the additives into the soil may occur at the same time or after the additives are added to the soil. In some embodiments, mixing of the additives into the soil will occur after the additives are added to the soil. Sometimes, the mixing will occur only shortly after the additives are added to the soil. In other embodiments, the mixing of the additives into the soil may not occur for some time, such as several minutes, or hours.

As depicted in FIG. 1, box 10, the modification of soil as described herein may be obtained from or conducted in any desired location and for any desired soil quantity. The location may or may not be on-site and may include a scaled up field operation. The methodology and machinery may vary depending on the soil condition, depth, etc. Those of skill in amending soil are familiar with the various types of machinery that may be used, including, as representative examples, trucks, excavators, bulldozers, pugmills, rotary augers, horizontal mixers and spray and injection devices.

No preparation of the soil is required. In one example, for on-site soil improvement, an excavator may initially be employed to locate and remove obstructions, including but not limited to underground obstructions, which would damage equipment used in operation or impair further use of the soil once modified. The excavator or other equipment may also be used to obtain or move the soil to another location prior to treatment. In addition or as an alternative, excavator or other equipment may turn over the soil prior to and/or after the additives are added to soil as described herein; however, no initial soil preparation is required in many instances. The excavator and/or other equipment may also be used to set various materials or equipment in the modified soil after modification, such as concrete, pipe sections, as examples, as represented in FIG. 1, box 60.

The excavating step when implemented prior to adding the additives is generally followed by treating the soil with the additive (e.g., FIG. 1, box 20). Depending on the particular site or location of the soil to be modified, the treatment may be implemented by first mixing the additives in a batch plant or batch mixer. As an alternative, the additives may be added in the required amount directly to the soil requiring modification and pre-blended and/or added on-site.

As described herein, the soil to be treated will generally be contacted with the additives in a single pass. Optionally additional passes may be performed. The amount of additive will often be pre-calculated, based on the size (area) and depth of soil to be treated and the desired outcome. Thus, as described herein is a method for treating soil with a soil additive in a predetermined amount to provide a desired soil composition having a specified strength, unconfined compression value and/or sulfate content. In a representative example, pre-calculation may include performing a small scale collection of soil in need of modification. The soil collections are often samples that include soil at one or more locations and/or at one or more depths desired to be modified. The depths typically range from a depth of 1 foot to a depth of 20 feet. The soil collections are often blended with the additives first and placed in sampling containers for identification of one or more properties. As an alternative, the soil collections may be placed in a soil container and then blended with the additives followed by identification of the one or more properties. When measuring a property in compliance with one or more standards, such as an ASTM standard, the soil container will be specifically sized as required by said standard. A typical ASTM mold size is 2 inch by 4 inch or 3 inch by 6.

After modification with the additives, the soil strength of each soil container may be measured using a pocket penetrometer. A UCS value of soil from each soil container is measured using, for example ASTM D1633. The sulfate content of soil from each container is measured according to EPA Method 300.1, as an example. Generally, a series of containers (generally of the same size) are each modified with varying additive combinations and/or soil depths in order to calculate a desired soil strength, UCS value, sulfate level and combinations thereof. The small scale collection as described is readily translatable (can be extrapolated) to a large scale field operation without undue experimentation.

In several embodiments, after the soil is treated with the additives, the soil is blended to a desired depth, as represented with FIG. 1, box 30. An excavator or other equipment may be used to blend the additives with the soil. The soil may be blended to a depth of about one foot or up to or more than five feet or 10 feet or 20 feet.

Prior to, during or after blending, the soil may be treated with one or more additional reagents that assist in adjusting the soil composition (e.g., FIG. 1, boxes 40, 50). Thus, the additives described herein may include an addition reagent(s) for modification of the soil. For example, with a more plastic soil, such as clay, a clay dispersant is included, sometimes after the additives are introduced to the surface of the soil. A clay dispersant, when added will maximize efficiency of the additives when combined and has also been found to improve the quality of the soil after treatment, such as by reducing clod size and/or providing a more homogenous blend of the improved soil composition. The additional reagent, such as the clay dispersant, is often added just prior to or while blending the additives with the soil. In one form, the additional reagent, such as a clay dispersant, is sprayed or misted in a liquid form onto the surface of the soil to be treated and prior to intermixing the additives with the soil. The additional reagent, when in liquid form and sprayed or misted on a large site, may be introduced using a water truck. When using a clay dispersant, the dispersant may be one known in the art. A suitable example is an acrylic polymer or copolymer or blend thereof that may or may not include a diluent. Another example includes an anionic surfactant in a hydrotreated distillate. The clay dispersant, when included as an additional reagent, is typically provided as a solution diluted with water. A suitable example is Thinz-it® (trademark registered with Wyo-Ben, Inc., of Montana, USA). In one embodiment, an amount of Thinz-it is a diluted solution of 0.125 to 0.175 gallons per 1000 gallons of water. The acrylic polymer in the solution is less than 1%. In some embodiments, the acrylic polymer in the solution is less than 0.2% or less than 0.02%. The diluted solution is then applied at an amount of 1% to 5% based on the weight of the soil. Application is often while treatment of the soil with the additives to form the soil composition.

The soil once treated may be suitable for use when a desired UCS is achieved (e.g., FIG. 1, box 70). Typically, the UCS is at or less than 100 psi in 28 days. The soil once treated as described herein may remain in place or be transported to another location for immediate or later use (e.g., FIG. 1, box 60).

Generally, additives provided as described herein are present in total in a range of from about 1% to about 30%, based on the weight of the soil. In one embodiment, the additives are provided in an amount that is about or less than about 25%, based on the weight of the soil. In another embodiment, the range of additives is from about 5% to about 25%, based on the weight of the soil. In another embodiment, the additives are in an amount that is about or less than 20%, based on the weight of the soil. In one embodiment, the additives are provided in a range of from about 8% to about 22%, based on the weight of the soil. In yet another embodiment, additives are provided in an amount of about 10% to about 20% weight percent, based on the weight of the soil. The additives in the combinations described herein improve soil strength.

In exemplary embodiments, a generally uncontaminated clay soil (wet clay, which is not sludge contaminated with petrochemicals or hydrocarbons) in need of improvement was amended with additives depicted in TABLE 1. The saturated clay soil had a moisture amount of about 25 wt. % and up to 85 wt. %, depending on depth (deeper samples were more saturated). The additives were combined in the various representative ratios depicted in TABLE 1 and improvements were measured, as depicted in TABLES 2 and 3. Additive A was Class C fly ash and Additive B was CFB ash.

For TABLES 1 to 3, additives in dry form were initially combined and then blended with soil composites extracted from combined depths ranging from 5 feet to 15 feet below grade. Blending included mechanical blending after which each modified sample was placed in a plastic soil container having a size of about 2 inches by 4 inches. Each soil sample remained in its container for up to 28 days, with soil strength measurements taken in the container using a pocket penetrometer on days 1, 3, 7 and 14. Certain soil samples were removed from their container when measuring UCS at day 14 or day 28 (in accordance with ASTM D1633). Sulfate levels were measured within 24 hours of mixing in accordance with EPA Method 300.1.

TABLE 1

Representative Examples of Additives and Soil Combinations.

| Sample | Additive A (%) | Additive B (%) | Soil (g) | Additive A (g) | Additive B (g) | Total Additives to Soil (wt. %) |
|---|---|---|---|---|---|---|
| 1 | 20 | 80 | 3000 | 60 | 240 | 10 |
| 2 | 40 | 60 | 1500 | 60 | 90 | 10 |
| 3 | 60 | 40 | 2000 | 120 | 80 | 10 |
| 4 | 80 | 20 | 2000 | 160 | 40 | 10 |
| 5 | 20 | 80 | 2000 | 60 | 240 | 15 |
| 6 | 20 | 80 | 2000 | 50 | 200 | 12.5 |
| 7 | 40 | 60 | 2000 | 120 | 180 | 15 |
| 8 | 60 | 40 | 2000 | 180 | 120 | 15 |
| 9 | 80 | 20 | 2000 | 240 | 60 | 15 |
| 10 | 20 | 80 | 2000 | 80 | 320 | 20 |
| 11 | 40 | 60 | 2000 | 160 | 240 | 20 |
| 12 | 60 | 40 | 2000 | 240 | 160 | 20 |
| 13 | 80 | 20 | 2000 | 320 | 80 | 20 |

Thus, as described, a suitable combination of additives may be prepared to meet a desirable requirement or a specific regulatory requirement. TABLES 2 and 3 also illustrate that the type and amount of additives employed may generally depend on the strength and/or sulfate content that is desired. Strength measurements were reported in TSF (tons per square foot), using a pocket penetrometer. UCS measurements were provided as psi (pounds per square inch). Because 1 TSF is equal to 13.89 psi, the strength of the representative samples after 14 days was found to be between 24.31 and 62.51 psi. In one form, to increase the psi or unconfined compressive strength of the formed composition, the total amount of additives was increased.

TABLE 2

Strength of Representative Soil Compositions.

| Sample | Strength day 1 (TSF) | Strength day 3 (TSF) | Strength day 7 (TSF) | Strength day 14 (TSF) | UCS at 14 days (psi) | UCS at 28 days (psi) |
|---|---|---|---|---|---|---|
| 1 | 1.50 | 1.50 | 2.00 | 2.00 | 16 | 19 |
| 2 | 1.60 | 2.10 | 2.25 | 2.25 | 17 | 18 |
| 3 | 1.45 | 1.50 | 1.70 | 1.75 | 17 | 21 |
| 4 | 1.45 | 1.55 | 1.75 | 2.00 | 18 | 15 |
| 5 | 2.25 | 2.75 | 3.40 | 4.25 | 53 | 50 |
| 6 | 1.10 | 1.30 | 1.50 | 1.65 | 18 | 19 |
| 7 | 2.10 | 2.60 | 3.30 | 3.50 | NT | 34 |
| 8 | 1.90 | 2.50 | 3.00 | 3.25 | NT | 47 |
| 9 | 1.35 | 1.75 | 2.50 | 2.50 | NT | 32 |
| 10 | 1.50 | 1.50 | 2.50 | 4.00 | NT | NT |
| 11 | 1.65 | 2.25 | 3.80 | 4.50 | NT | NT |
| 12 | 1.45 | 2.20 | 3.10 | 4.00 | NT | NT |
| 13 | 1.45 | 1.45 | 2.35 | 2.75 | NT | NT |

The samples identified in TABLE 1 were analyzed for sulfate content after the addition and blending of the additives with the soil. The measurements depicted in TABLE 3 illustrate that soil compositions and processes described herein will maintain a sulfate content of the soil that is less than 5,000 ppm. Such levels are desirable for certain soil preparations or uses.

TABLE 3

Sulfate Content of Representative Soil Compositions.

| Sample | Sulfate Content (ppm) |
|---|---|
| 1 | 715.0 |
| 2 | 916.0 |

TABLE 3-continued

Sulfate Content of Representative Soil Compositions.

| Sample | Sulfate Content (ppm) |
| --- | --- |
| 3 | 950.0 |
| 4 | 693.0 |
| 5 | 2180.0 |
| 6 | 960.0 |
| 7 | 1060.0 |
| 8 | 1400.0 |
| 9 | 981.0 |
| 10 | NT |
| 11 | NT |
| 12 | NT |
| 13 | NT |

For large scale operations, the soil in need of modification may be separated into treatment cells. The additives are introduced in dry form to the surface of a soil treatment cell using a truck. One truck is often enough to treat one treatment cell. The treatment cell may be further treated with an additional reagent, such as an acrylic polymer in a diluted solution that has a quantity of polymer that is less than 1% and which is applied to the treatment cell in an amount of between about 1% to 5% based on the weight of the soil. The additives (with or without additional reagent(s)) are evenly spread onto the surface of the treatment cell. The mixture is then blended to a suitable depth. The soil may be ready for further use within as early as about 3 days after it is modified. In some embodiments, the soil is ready for use within or up to about 7 days. In some embodiments, the soil is ready for use within or up to about 14 days. In some embodiments, the soil is ready for use within or up to about 28 days. In many embodiments, after treatment, the modified soil may remain un-used for an indefinite period of time. Initial sampling of each treatment cell using soil composites of varying depth and with one or more additive combinations will allow the mixture to be site specifically modified and treated.

To meet state or federal road and/or soil requirements, additives described herein may be readily adjusted as shown. Said additives do not increase harmful contaminants in the soil after modification. Said additives are not added in a quantity that solidify the soil to form a highly hardened material or monolith. For example, the additives, when included with the soil do not solidify the soil to form a monolith, such as a cement-like solid, as will occur with solidification processes that use a cementitious binder or other additives, which are generally provided in larger amounts than is described herein.

The additives with or without additional reagents as described herein may be readily prepared for small and large scale production and any size in between. In use, soil compositions described herein may be prepared and capable of use after modification as a road base or for installing or supporting building or equipment. The soil compositions when prepared may be suitable for high and low traffic roads.

The soil compositions described, after treatment, will maintain a low sulfate content of the treated soil, including a sulfate content of 5,000 ppm or less. The soil compositions described, after treatment, will have an increased soil strength, allowing the soil to have a sufficient bearing capacity to support above ground structures and installation thereof as well as to support equipment used in the installation of, for example, foundation structures, road works and/or piling structures.

The soil compositions described, after treatment, will satisfy or maintain a desired UCS value for large scale projects, including fast-track projects. The soil compositions described, after treatment, will satisfy desired UCS values of 100 psi or less at 28 days, even for large scale projects. The soil compositions described are cost effective while satisfying and maintaining a desired or low sulfate content and/or a desired or low UCS value of 100 psi or less at 28 days.

Although representative processes and articles have been described in detail herein, those skilled in the art will recognize that various substitutions and modifications may be made without departing from the scope and spirit of what is described and defined by the appended claims.

What is claimed is:

1. A soil composition comprising soil that has been strengthened to an unconfined compressive strength of less than 100 psi in 28 days,
wherein the soil is strengthened by an addition in a dry or powder form comprising:
a first ash particle, wherein the first ash particle is in dry or powder form and has a calcium oxide content greater than a second ash particle; and
the second ash particle comprising a fly ash having a calcium oxide content that is greater than 20 wt. % with a low sulfate content less than that of the first ash particle,
wherein the second ash particle is in dry or powder form,
wherein the addition added to the soil is in an amount that is about or less than about 25 wt. % based on weight of the soil, the soil composition with the addition therein having a sulfate content less than 5000 ppm.

2. The soil composition of claim 1, wherein the first ash particle is a circulating fluidized boiler ash.

3. The soil composition of claim 1, wherein the first ash particle is a combustion by-product from a lime or limestone injection boiler.

4. The soil composition of claim 1, wherein the second ash particle is Class C fly ash with a calcium oxide content up to about 60 wt. %.

5. The soil composition of claim 1, wherein the soil composition further comprises a polymer that is an acrylic polymer or copolymer and is added to the soil in an amount that is between about 1% and 5%, based on the weight of the soil.

6. The soil composition of claim 1, wherein the soil is considered to be uncontaminated by harmful petrochemicals or hydrocarbon compounds or is not sludge from a commercial or industrial operation.

7. The soil composition of claim 1, wherein the first ash particle is at least one of a boiler ash, bed ash, and bottom ash, from a combustion that includes lime or limestone.

8. The soil composition of claim 1, wherein the addition is combined together prior to being added to the soil.

9. The soil composition of claim 1, wherein the addition is added in separate components to the soil.

10. The soil composition of claim 1, wherein the addition does not require a cementitious binder or a hydration reaction.

11. The soil composition of claim 1, wherein the addition does not undergo further surface modification prior to being added to the soil.

12. The soil composition of claim 1, wherein the soil composition is ready for use in as early as three days after the addition is added to the soil.

13. A composition comprising soil, circulating fluidized boiler ash, and Class C fly ash, wherein the composition when blended has an unconfined compressive strength of less than 75 psi at in 28 days and a sulfate content less than 5000 ppm, and
wherein the soil is not sludge from a commercial or industrial operation.

14. The composition of claim 13, wherein in addition to the composition, a dispersant is included, the dispersant comprising any one or more of an anionic surfactant and an acrylic polymer or copolymer.

* * * * *